United States Patent [19]

Ross

[11] 4,299,788
[45] Nov. 10, 1981

[54] PROCESS FOR MANUFACTURING STRANDED COPPER WIRE

[75] Inventor: John A. Ross, Wallingford, Pa.

[73] Assignee: E. I. Du Pont de Nemours and Company, Wilmington, Del.

[21] Appl. No.: 149,659

[22] Filed: May 14, 1980

[51] Int. Cl.³ .............................................. B29F 3/10
[52] U.S. Cl. .................................... 264/85; 264/127; 264/174; 425/113
[58] Field of Search ......... 264/85, 174, 127, DIG. 65; 425/DIG. 55, 113

[56] References Cited

U.S. PATENT DOCUMENTS

| 2,685,707 | 8/1954 | Llewellyn et al. | 264/174 |
| 2,736,957 | 3/1956 | Heering | 29/528 |
| 2,881,142 | 4/1959 | Eldridge | 264/127 |
| 2,975,110 | 3/1961 | Weeber et al. | 204/9 |
| 3,260,774 | 7/1966 | Harlow | 425/113 |
| 3,689,610 | 9/1972 | Nicholson | 264/85 |
| 3,869,235 | 3/1975 | Moore | 425/DIG. 55 |

OTHER PUBLICATIONS

"Foaming FEP for Wire Insulation", reprint *Plastics Technology*, 7-64, Randa, Du Pont de Nemours, Inc.

Primary Examiner—Jeffery R. Thurlow

[57] ABSTRACT

Oxidation of stranded copper wire during high temperature coating with non-melt-fabricable tetrafluoroethylene polymer is substantially prevented by subjecting the wire to a nonoxidizing atmosphere during heating immediately prior to and during coating.

2 Claims, 1 Drawing Figure

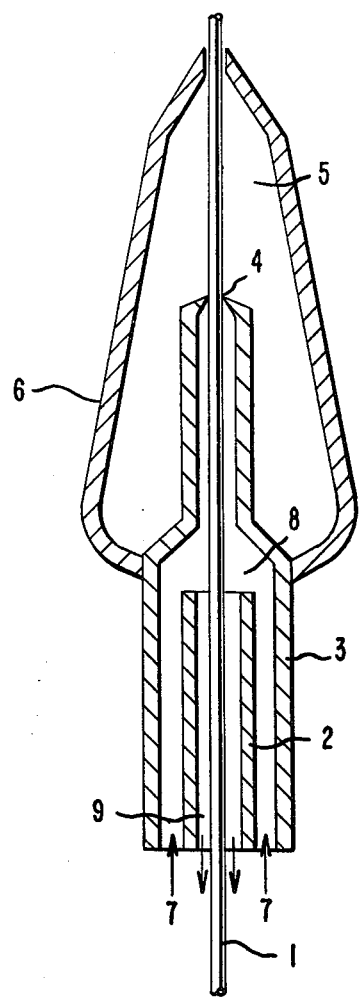

PROCESS FOR MANUFACTURING STRANDED COPPER WIRE

FIELD OF THE INVENTION

This invention relates to the manufacture of stranded copper wire insulated with a coating of tetrafluoroethylene polymer.

BACKGROUND OF THE INVENTION

Tetrafluoroethylene polymers are used to provide a protective coating around copper wire that is used for electrical wiring. The tetrafluoroethylene polymer is paste extruded around the wire by extruding a polymer paste through an extruder die around copper wire as the wire is passed lengthwise through an extruder.

The tetrafluoroethylene polymer is mixed with a lubricant, typically a petroleum distillate fraction such as naphtha, to form the polymer paste. The paste is extruded at temperatures typically between 90° and 130° F. Following extrusion the coated wire is raised in temperature first to dry off the lubricant, and next in progression to raise the polymer above its sinter temperature. The coated wire typically reaches 700° to 750° F. in the sintering stage.

In the extrusion process, air is present along the wire surface. At the high temperatures required for sintering the polymer, the oxygen in the air along the wire surface oxidizes the copper. Presence of this oxidized surface interferes with solderability of the insulated wire and with electrical conductivity of the wire.

SUMMARY OF THE INVENTION

The process of this invention is an improvement in the paste extrusion process for coating tetrafluoroethylene polymer around stranded copper wire and then drying and sintering the coating around the wire, which improvement comprises employing a nonoxidizing atmosphere along stranded copper wire prior to applying the polymer to the wire.

By employing the stranded wire in a nonoxidizing atmosphere, a bright nonoxidized surface is maintained on the wire during sintering.

DESCRIPTION OF THE DRAWING

The drawing depicts an apparatus for purging the in-running wire of air and substituting a nonoxidizing atmosphere.

DESCRIPTION OF THE INVENTION

The procedure for paste extruding tetrafluoroethylene polymer to coat copper wire is well known in the art, and is described further above.

Continuous copper wire is fed into a wire extruder head through a mandrel tube. As the wire leaves the mandrel tube in the head, polymer is pressured onto the wire as a coating envelope and together the wire and coating transit the die head. This is a cold flow process, followed usually in-line by heating to dry and sinter. In this invention a nonoxidizing atmosphere such as an inert gas, such as nitrogen or a rare earth gas, e.g., argon, or a 95/5 percent by weight mixture of nitrogen and hydrogen, is continuously injected into the mandrel through which the wire is guided into the device to surround the wire and prevent oxygen from contacting the wire. Common extruders for such wire extrusion are the Jennings or Davis extruders.

While the nonoxidizing atmosphere can be maintained by a convenient means, one means is depicted in the drawing. In the drawing, copper wire (1) is fed into an extruder and moves left to right inside purge tube (2) which is itself concentric in mandrel support tube (3). The wire then moves through needle point (4) and then into contact with polymer in compartment (5), which polymer enters compartment 5 at an entry point in shell (6) which is not shown. The purge gas enters at (7) and flows left to right, as indicated by the arrows, outside of the purge tube (2) until it reaches the right end of compartment (8). Since exit (9) is the only exit, the gas then runs right to left along the copper wire in counterflow to the in-run of the wire. This aids in purging the wire of any drag-layer of air.

The tetrafluoroethylene polymer employed herein is the non-melt-fabricable class of tetrafluoroethylene polymer, as opposed to the lower melting, melt-fabricable class of tetrafluoroethylene polymer. The difference between these classes of tetrafluoroethylene polymers can be determined by melt viscosity. Nonmelt-fabricable polymers have high melt viscosities, e.g., $1 \times 10^9$ poise or more at 380° C.; while melt-fabricable polymers have much lower melt viscosities, e.g., on the order of $1 \times 10^4$ to $1 \times 10^6$. Melt viscosity of the polymer depends in large part upon the amount, if any, if comonomer present. Generally, the more comonomer present, the lower the melt viscosity. Melt viscosity also depends on the molecular weight of the comonomer. Thus non-melt-fabricable tetrafluoroethylene polymers employed herein include polytetrafluoroethylene and copolymers of tetrafluoroethylene and different perfluorinated ethylenically unsaturated monomers present in an amount which does not cause the melt viscosity of the resultant copolymer to be below $1 \times 10^9$ poise at 380° C. One preferred class of ethylenically unsaturated monomers is perfluoro (alkyl vinyl ethers) of 3–7 carbon atoms. Another preferred class is perfluoro (terminally unsaturated olefins) of 3–7 carbon atoms.

The tetrafluoroethylene polymers employed herein are prepared by the aqueous dispersion preparative method, rather than by the suspension polymerization method. In the aqueous dispersion method, a dispersion of the polymer is obtained by polymerization in an aqueous medium containing dispersing agent, such as from 0.2 to 0.8% by weight (based on water) ammonium polyfluorocarboxylate containing 7–10 carbon atoms, to form a dispersion of tetrafluoroethylene polymer particles in water. These particles are substantially round and have an average diameter generally within the range of 0.1 to 0.5 micron; polymer concentration is not critical, but generally ranges between 45 and 75% by weight based on weight of dispersion (polytetrafluoroethylene plus water plus nonionic surfactant). Preferred tetrafluoroethylene polymer concentration in the dispersion is 55 to 65% based on weight of dispersion. The pH of the dispersion may be adjusted, if desired, to at least 7 by the addition of a basic compound in order to minimize corrosive attack on metal surfaces. On coagulation, the resulting powder obtained is usually referred to in the art as "fine powder" (on the other hand, the powder obtained from suspension polymerization is usually referred to as "granular" resin).

Preferably the copper wire is cleaned prior to use in this invention. One means of cleaning is to employ ultrasonic cleaning systems.

In addition, copper metal usually carries absorbed air and may also have a molecular water film on its surface.

Both the absorbed air and the film should be substantially removed prior to use in this invention and such can be accomplished by subjecting the wire to a vacuum bake.

EXAMPLE

The extruder employed was a Davis paste extruder having a 2" extruder barrel with a ⅜" mandrel. The die was 0.055" with a 0.032×0.043" tip. The barrier tube was 90 inches long with an inner diameter of 0.094" and an outer diameter of 0.120". AWG 22 19/34 unilay, bare copper strand with a nominal diameter of 0.0296" was passed through the extruder at a rate of 87 feet per minute. A polytetrafluoroethylene homopolymer was made into a paste by adding 18% by weight of a 50/50 mixture of Isopar E and Isopar H to the polymer.

The extruder barrel temperature was 110°–120° F. and the head was 130°–140° F. The polymer insulation was set for 10 mils thick coating. Nitrogen gas at 3 standard cubic feet hour was continuously injected into the extruder to purge the wire in counter-flow for the length of the mandrel tube.

The extrudate was dried prior to sintering at 450°–500° F. for 14 seconds. It was then exposed to sintering temperature for 21 seconds.

After coating, sintering and cooling, the coated wire was examined by slicing coating away. The copper surface under the coating was a bright copper color, showing that no surface oxidation had occurred.

The good solderability of the coated wire was demonstrated by soldering with conventional tools, a gun and an iron, using standard electronic core fluxed solder.

I claim:

1. In the process for coating non-melt-fabricable tetrafluoroethylene polymer onto stranded copper wire by extruding the tetrafluoroethylene polymer around the stranded copper wire as the wire travels lengthwise through the die of a wire-coating extruder, the improvement which comprises employing a nonoxidizing atmosphere along the copper wire prior to applying the polymer to the wire, and causing said atmosphere to flow along the surface of the copper wire in a direction counter to the direction of travel of said wire.

2. The process of claim 1 wherein the nonoxidizing atmosphere is nitrogen.

* * * * *